(12) United States Patent
Schmitz (10) Patent No.: US 8,794,611 B2
(45) Date of Patent: Aug. 5, 2014

(54) METHOD AND DEVICE FOR COATING A CATALYST SUPPORT BODY WITH CATALYST-FREE OUTER SURFACE

(75) Inventor: Kai Schmitz, Haßbergen (DE)

(73) Assignee: BASF SE, Ludwigshafen (DE)

( * ) Notice: Subject to any disclaimer, the term of this patent is extended or adjusted under 35 U.S.C. 154(b) by 29 days.

(21) Appl. No.: 13/260,070

(22) PCT Filed: Mar. 24, 2010

(86) PCT No.: PCT/EP2010/053809
§ 371 (c)(1),
(2), (4) Date: Dec. 30, 2011

(87) PCT Pub. No.: WO2010/108940
PCT Pub. Date: Sep. 30, 2010

(65) Prior Publication Data
US 2012/0114853 A1  May 10, 2012

(30) Foreign Application Priority Data

Mar. 24, 2009  (EP) ..................................... 09155946

(51) Int. Cl.
*B05D 7/22* (2006.01)
(52) U.S. Cl.
USPC ............ 269/56; 369/71; 369/289 R; 369/294; 118/406; 118/408; 118/421; 118/423; 118/428; 118/500; 427/230; 427/235
(58) Field of Classification Search
USPC .......... 427/230–239; 118/500, 421, 423, 428; 269/56, 71, 289 R, 294
See application file for complete search history.

(56) References Cited

U.S. PATENT DOCUMENTS

| | | | |
|---|---|---|---|
| 4,208,454 A * | 6/1980 | Reed et al. .................... | 427/238 |
| 5,182,140 A | 1/1993 | Watanabe et al. | |
| 6,149,973 A * | 11/2000 | Foerster et al. ................ | 427/235 |
| 6,599,857 B2 * | 7/2003 | Taniguchi et al. ............ | 502/300 |
| 2002/0073542 A1 | 6/2002 | Tamura et al. | |

FOREIGN PATENT DOCUMENTS

| | | |
|---|---|---|
| JP | 2000-197840 | 7/2000 |
| JP | 2002-172336 | 6/2002 |
| JP | 2002-242668 | 8/2002 |
| WO | WO-01/10573 | 2/2001 |
| WO | WO 01/10573 A2 * | 2/2001 |

OTHER PUBLICATIONS

IPRP in PCT/EP2010/053809, dated Sep. 27, 2011, 9 pgs.

* cited by examiner

*Primary Examiner* — Dah-Wei Yuan
*Assistant Examiner* — William Phillip Fletcher, III
(74) *Attorney, Agent, or Firm* — Servilla Whitney LLC (57) ABSTRACT

The invention relates to a method for coating a catalyst support body, which comprises: providing the catalyst support body as well as slurry located within a pan; introducing an open input end of the catalyst support body into the slurry; and, subsequently, directing an amount of the slurry though the input end and into the inside of the catalyst support body. At least a part of the circumference of the input end is covered with an impermeable sealing element while slurry is directed through the open end. In this way, contact between slurry and a circumferential outer surface of the catalyst support body is prevented and slurry is provided through the open end to an inner surface of the catalyst support body. Further, the invention relates to a loading platform for carrying out the method. The inventive assembly comprises a loading platform adapted for releasably holding a catalyst support body, and a cover mechanism having a sealing holder and a ring shaped sealing element attached to the sealing holder. The cover mechanism further comprises a first lifting mechanism connected to the sealing holder, wherein the first lifting mechanism provides a moving direction for the sealing holder along a longitudinal axis of the sealing element relative to the loading platform. In addition, the invention relates to a coating station comprising the loading platform. The coating station comprises a slurry pan and a second lifting mechanism providing a relative moving direction between the pan and the loading platform. The first lifting mechanism is synchronized with the second lifting mechanism by a synchronization device.

15 Claims, 5 Drawing Sheets

METHOD AND DEVICE FOR COATING A CATALYST SUPPORT BODY WITH CATALYST-FREE OUTER SURFACE

CROSS-REFERENCE TO RELATED APPLICATIONS

This application is the National Stage entry of PCT/EP2010/053809, filed on Mar. 24, 2010, which claims priority to European Patent application number 09155946.8, filed on Mar. 24, 2009, both of which are incorporated herein by reference in their entireties.

FIELD OF THE INVENTION

The invention relates to a method and an apparatus for coating a catalyst support body. In particular, the invention relates to a mechanism for preventing the contact between catalyst material to be introduced into the catalyst support body and the outer surface of the catalyst support body.

The invention relates to a slurry-based coating method, in which a monolithical catalyst support body is filled with catalyst material by providing a slurry, i.e. a suspension of solid catalyst particles and a liquid, wherein the suspension, i.e. the slurry, is introduced into the catalyst support body in liquid form. Subsequently, the liquid is removed from the catalyst support body by drying and the catalyst particles remain within channels of the catalyst support body. In general, the catalyst support body is in elongated form having linear channels extending within the catalyst support body in form of straight channels. The channels are surrounded by a closed outer surface circumferentially encompassing the channels between two open ends of the catalyst support body, which are connected by the channels. This general structure allows a simple mechanism for introducing the slurry (containing the catalyst material) into the catalyst support body. One of the open ends is put into the slurry, and, at the same time, a vacuum is applied to the opposed open end, thereby drawing the slurry into the channels.

PRIOR ART

Known prior art techniques for introducing catalyst material into a monolithic catalyst support body are based on the approach described above. Thus, prior art methods in general comprise the following steps: introducing a first open end of the support body into the slurry and drawing the slurry through the channels of the catalyst support body. However, since one of the open ends of the support body necessarily contacts the slurry, a part of the outer surface of the support body is wetted or coated with slurry.

Firstly, a catalyst material comprises precious materials, which are not involved in catalytic reactions since the outer surface of the catalyst support body is not in contact with exhaust gases during operation due to the canning surrounding the catalyst support body. Thus, not all of the catalyst material is used in an efficient way. In order to regain the unused catalyst material, the outer surface of the support body is cleaned, brushed or blasted. In this way, some of the material can be regained and the outer surface can be provided in a clean way, which is important, for example, if the canning involves welding. However, at the same time, the manufacturing of such a catalyst support body is relatively costly due to the additional cleaning and regaining steps. In addition, not all of the unused material at the outside of the support body can be regained.

It is therefore an object of the invention to provide a mechanism for manufacturing a catalyst support body with an outer surface free from catalyst material.

SUMMARY OF THE INVENTION

This object is met by the method and the device of the independent claims.

The concept underlying the invention is realized by a sealing element which covers (the outer rim of) the outer surface of a catalyst support body (at one end of the support body) and thereby inhibits any contact between slurry and outer surface of the support body during immersion of (a part of) the support body in the slurry. The sealing element contacts the circumference of an input end of the catalyst support body during the coating process, i.e. during the immersion of the input end in the slurry and during the application of slurry into the inside (i.e. into the channels) of the catalyst support body. The sealing element covers the circumferential edge of the (cylindrical) catalyst support body or a circumference at or close to the input end of the support body. In this way, the contact between slurry and outer surface of the catalyst support body is prevented or minimized and, at the same time, all channels within the support body ending at the input end of the support body are provided with slurry.

According to one aspect of the invention, an inventive loading platform assembly comprises a loading platform for holding the catalyst support body as well as a cover mechanism comprising the sealing element. A (first) lifting mechanism of the loading platform covers the input end with the sealing element as described above during the application of slurry into the support body. This lifting mechanism brings the sealing element into contact with the circumferential edge of the input end or with a circumference at or near the input end of the catalyst support body before the input end of the catalyst support body contacts the slurry and maintains the contact between sealing element and support body during the complete coating step until the input end is removed from the slurry after the coating process is completed. Thus, the sealing element as well as the catalyst support body are removed form the slurry and, after this removal, the sealing element is released from the catalyst support body.

The catalyst support body extends along the line which is defined by the circumferential rim of the catalyst support body at the input end. In other words, the contacting line is defined by the perimeter of the cross-section of the support body at the input end in form of a circle or any other closed line. The line is defined by the circumferential edge of the (input) end of the support body. The sealing element radially extends towards its centre, is in form of a ring, and is inclined towards the longitudinal axis of the sealing element. The opening defined by the ring shape of the sealing element, i.e. the inner circumference of the ring, is smaller than the cross-section of the input end of the catalyst support body. The outer circumference of the sealing element encloses a cross-section greater than the cross-section of the input end. In this way, the input end can be fitted onto the sealing element, thereby covering the circumferential edge at the input end (and therewith the outer surface of the catalyst support body) during the coating process. Thus, the width and the shape of the sealing element match the cross-section of the input end circumference. The complete cross-section of the input end can be brought into contact with the slurry since the sealing element contacts the input end only at the circumferential edge at the input end providing free access of the complete (inner) cross-section of the input end to the slurry. In this way, the slurry can be fed into the catalyst support body through the inner opening of the sealing element.

The sealing element has an inner surface or edge, which is closed. The surface or edge is adapted to the shape of the circumference of the support body (at the input end of the support body). Further, the sealing element extends along a closed line. In a particular case, according to which the closed line is a circle, the sealing element is in annular shape. In a corresponding embodiment, the close line is ovoid or ellipsoid. The cross section perpendicular to a tangential direction of the sealing element can have any shape of including trapezoid, the shape of a rounded or a truncated triangle (truncated apex) or any polygonal or ovoid shape. The cross section perpendicular to a tangential direction of the sealing element tapers towards the centre axis of the sealing element.

Since the sealing element contacts the catalyst support body only along the line defined by the circumference of the input end, no slurry is applied to the outside of the catalyst support body even if the sealing element is covered with slurry resulting from preceding coating steps. In any case, the sealing element prevents any application of slurry onto the outer surface of the support body and enables contact of the complete cross-section of the input end, i.e. the front end of the support body, with the slurry.

According to the invention, the beginning and the end of the coating process is synchronized with the application of the sealing element onto the input end. In particular, the movement of the sealing element is synchronized such that upon start of immersion of the input end into the slurry, the sealing element covers the input end, and, upon completion of the immersing steps, or thereafter, the sealing element is removed from the catalyst support body. Thus, the synchronization provides coverage of the input end with the sealing element as long as the input end is in contact with the slurry. In addition, the sealing element can be maintained in contact with the input end in advance to the immersion process and/or after the immersion process has ended.

According to a first aspect of the invention, a method for coating a catalyst support body is provided according to which the catalyst support body as well as slurry located within a pan is provided and an open input end of the catalyst support body is introduced into the slurry. In this regard, the slurry is a suspension and/or a solution of catalyst material provided by adding a liquid, which preferably contains water, to catalyst material. According to the method, subsequently to the introduction of the input end, an amount of the slurry is directed through the input end and into the inside of the catalyst support body. In this regard, the inside of the catalyst support body comprises channels, which end at the input end of the catalyst support body. At least a part of the circumference of the input end is covered with an impermeable sealing element during the step of directing the slurry through the open end. This prevents contact between slurry and a circumferential outer surface of the catalyst support body. The circumferential outer surface of the catalyst support body is distinct to the input end (and also to an output end of the catalyst support body). The slurry is applied through the input end of an inner surface of the catalyst support body. Further, the slurry is applied through (the opening of) the impermeable sealing element, the sealing element sealing only the circumference of the input end and allows slurry to pass through an opening of the sealing element towards the input end.

The input end of the catalyst support body is introduced into the sealing element or is pressed against the sealing element and maintained in contact before the step of introducing the input end into the slurry and preferably also during the step of directing the slurry into the catalyst support body. In addition, the input end is introduced into the sealing end or is pressed onto the sealing element initial to the step of introducing the input end (and therewith the sealing element) into the slurry. Since the sealing element is engaged with the input end for covering, the input end is introduced into the slurry together with the sealing element. The sealing element is maintained in direct contact with the input end during the complete step of introducing and maintaining the input end into the slurry. In other words, the circumference of the input end is covered by the sealing element during the complete duration of the steps of introducing and maintaining the input end in the slurry. In particular, the sealing element covers the circumference of the input end while the slurry is directed into the catalyst support body.

The input end of the catalyst support body is pressed onto the sealing element or is circumferentially enclosed by the sealing element when the input end, together with the sealing element, is immersed within the slurry located in the pan. The input end of the catalyst support body is pressed onto the sealing element (or vice versa) or is circumferentially enclosed by the sealing element during the complete duration of the step of immersing the input end into the slurry.

After the step of directing slurry or upon completing the step of directing slurry through the input end, the sealing element and the input end are separated from each other. Upon or after the input end and the sealing element have been removed from the slurry located in the pan (i.e. after the step of immersing the input end into the slurry has been completed) the sealing element and the input element are separated form each other. The separation is carried out by a relative (translational) movement between sealing and input element along a longitudinal axis and by increasing a distance between input end and sealing element. In particular, the separation can be carried out by lowering the sealing element, by raising the input end or by both, thereby increasing the distance between the input end and the sealing element.

The step of directing an amount of slurry is provided by applying a pressure difference between the input end of the catalyst support body and an output end of the catalyst support body. The output end of the catalyst support body is in fluidic connection with the input end via a plurality of channels within the catalyst support body. Preferably, the catalyst support body is in cylindrical form and the input end is opposed to the output end. The application of a pressure difference causes the amount of slurry to flow from the pan through an inner opening of the sealing element, through the input end and to the output end. In this way, inner surfaces of the channels within the catalyst support body are wetted or covered by slurry, the slurry comprising catalyst material. The channels provide a fluidic connection between input end and output end. The fluidic connection comprises an inner surface of the support body. The slurry is applied onto this inner surface provided by the inner channels.

According to the inventive method, the step of introducing comprises releasably holding the catalyst support body by a loading platform and reducing a distance between the loading platform holding the catalyst support body and the pan. By reducing the distance, the input end of the catalyst support body is immersed into the slurry located within the pan. The distance can be reduced by lowering the loading platform, together with the catalyst support body, towards the pan, by lifting the pan towards the loading platform, or by both. The circumference of the input end is covered with the sealing element, which is connected to a sealing holder. Therefore, the sealing element is held and/or moved by holding or moving the sealing holder. The sealing holder presses the sealing element onto the circumference of the input end before and during the introduction of the input end, during the immersion of the input in the slurry and while an amount of slurry is directed through the input end into the inner surfaces of the catalyst support body provided by channels within the catalyst support body. The sealing holder separates the sealing element from the input end after the step of directing has been completed and contact between the input end and the slurry located in the pan has ended. Thus, the sealing holder separates the sealing element after the immersion has been completed, wherein separation can be carried out by lowering the sealing holder relative to the loading platform and the catalyst support body, by lifting the loading platform and the catalyst support body relative to the pan or by both of these movements. These movements are preferably translative movements.

According to a second aspect of the invention, a loading platform assembly is provided comprising a loading platform adapted for releasably holding the catalyst support body. The loading platform further comprises a cover mechanism having a sealing holder and a ring-shaped sealing element (as described above) attached to the sealing holder. The cover mechanism further comprises a first lifting mechanism connected to the sealing holder, wherein the first lifting mechanism is adapted for providing movements along a longitudinal axis of the sealing element relative to the loading platform. In other words, the first lifting mechanism provides a moving direction for the sealing holder along a longitudinal axis of the sealing element relative to the loading platform. Thus, the first lifting mechanism is adapted for lifting and lowering the sealing element (by moving the sealing holder to which the sealing element is attached to) relative to the loading platform and, consequently, relative to the catalyst support body which is releasably held by the loading platform.

According to a third aspect of the invention, a coating station is provided for applying an amount of slurry to the inside of a catalyst support body (i.e. to inner surfaces provided by channels within the catalyst support body), the coating station comprising the loading platform as described above or as defined in claim 7. The coating station comprises a pan, in which slurry is located. The coating station has a second lifting mechanism which provides a relative moving direction between the pan and the loading platform for immersing and removing an input end of the catalyst support body releasably held by the loading platform into and from the slurry located in the pan. The second lifting mechanism is adapted for lowering and lifting the loading platform relative to the pan by lowering and lifting the loading platform relative to the pan, by lowering and lifting the pan relative to the loading platform, or by both of these movements. Preferably, the second lifting mechanism is attached to the pan and lifts and lowers relative to the loading platform, which has a fixed position with regard to the moving direction provided by the second lifting mechanism.

The coating platform or the loading platform or both comprise a synchronization device which connects the first lifting mechanism with the second lifting mechanism in a mechanical, hydraulic, pneumatic, or electrical way. Thus, the movements provided by the first and the second lifting mechanisms are synchronized with each other. In this regard, synchronization is not limited to co-incidental movements. Rather, synchronization also covers coordinated movements of both lifting mechanisms wherein the movements can be mutually delayed to each other. In particular, a lifting movement of the second lifting mechanism, which moves the pan towards the catalyst support body held by the loading platform can be synchronized by the synchronization device with a predefined delay to the movement of the first lifting mechanism, which presses and maintains the sealing element towards and at the input end. In this way, the synchronization device ensures that the sealing element covers the circumference of the input end when the catalyst support body is immersed into the slurry located in the pan. In the same way, a lowering movement of the first lifting mechanism is delayed by the synchronization device relative to a movement of the second lifting mechanism when the second lifting mechanism lowers the pan and separates the slurry within the pan from the input end in a predefined delay time period before the first lifting mechanism lowers the sealing element and separates the sealing element from the circumference of the input end. In addition, the synchronization device can coordinate time as well as the speed of the movements such that, for example, a slow movement of the first lifting mechanism delays the physical separation of the sealing element from the circumference of the input end. Preferably, the synchronization device is provided by a circuit, preferably a digital circuit or a programmable circuit, together with software, which controls electrical, electro-pneumatic or electro-hydraulic actuators, wherein the first as well as the second lifting mechanism have an individual actuator, which can be individually controlled by the synchronization device. A mechanical synchronization device can comprise a suspension, for example a pneumatic or hydraulic cylinder or dashpot, which delays and slows movements and, therefore, delays the point of time at which the first lifting mechanism physically separates the sealing element from the circumference of the input end or the point of time, at which the second lifting mechanism brings the slurry located within the pan in physical contact with the input end of the catalyst support body.

In general, the first lifting mechanism connected to the sealing holder comprises an individual actuator, which is adapted to be controlled separately from any actuators of the pan or of the loading platform. This ensures that the first lifting mechanism can be activated with a (positive or negative) time delay (i.e. delayed or in advance) with regard to the second lifting mechanism, which brings the input end in contact with the slurry within the pan or separates the input end from the slurry located within the pan.

The sealing element has preferably the shape of a ring, for example an ovoid, circular or polygonal ring. The sealing element comprises a lip having a shape adapted to the shape of the sealing element. The lip has preferably the same geometrical form or proportions as the sealing element, except for the particular dimensions. According to the invention, the lip is in direct contact with the circumference of the input end, preferably on the complete circumference of the input end (i.e. 360°), when the sealing element covers the circumference of the input end. In cross-section, the lip is inclined and does not extend towards the centre of the sealing element in exact radial direction. Rather, the lip extends in a direction away from the loading platform and extends in direction towards the pan. The lip is adapted to contact a complete circumference (i.e. 360°) of an outer surface of the catalyst support body at the input end of the catalyst support body. In this way, the lip does not exactly extend within the plane, in which the sealing element extends. Rather, the direction, in which the lip extends towards the centre of the sealing element, is inclined to the exact radial direction. Thus, the sealing element is in a shape of a ring having an outer and an inner circumference, wherein the inner circumference is identical to the inner edge of the lip. The plane, in which the outer circumference extends is parallel to the plane, in which the inner circumference extends. The plane, in which the inner circumference extends is displaced with regard to the plane, in which the outer circumference extends along the longitudinal axis of the sealing element towards the pan and away from the catalyst support body (i.e. away from the loading platform). In this direction, i.e. away from the loading platform, the sealing element is tapered. The inner cross-section decreases with increasing distance between cross-section and loading platform. The sealing element is in the shape of a frustum tapering towards the pan.

The coating station according to the invention comprises a moveable vacuum hood adapted to sealingly contact the loading platform on an upper side of the loading platform and to apply vacuum to a volume enclosed by the hood and the upper side of the loading platform. In this way, vacuum is applied to an upper section of the catalyst support body as well as to an output end of the support body (opposite to the input end of the support body). The vacuum hood can be connected to a third lifting mechanism, which is preferably also connected to the synchronization device. The step of directing an amount of slurry to the input end is directly related to the step of applying vacuum, wherein the start of application of vacuum is identical to the start of the step of directing slurry into the catalyst support body. Ending the application of vacuum by the vacuum hood also ends the step of directing slurry into the catalyst support body. In this way, the step of directing slurry can be exchanged by the appropriate steps of applying vacuum to the output end of the catalyst support body within the volume enclosed by the hood and the upper side of the loading platform.

The second lifting mechanism is preferably connected to the pan for controllably moving the pan towards a lower side of the loading platform, which is opposed to the upper side of the loading platform. Further, the second lifting mechanism moves the pan away from the lower side of the loading platform along the relative moving direction between pan and loading platform. In general, all lifting mechanisms, lifting devices and actuator devices described above accomplish a translational movement for approaching/releasing the loading platform/the sealing element/the pan rather than a rotational movement. Preferably, the translational movements are along the direction of gravity. However, moving mechanisms connected to the loading platform and/or to a vacuum hood can be adapted for pivoting and/or translational movements.

The synchronization device of the inventive coating is adapted to coordinate the movements of the first lifting mechanism and the second lifting mechanism (and of the third lifting device, if applicable) to inhibit any further approach resulting from actuation of the second lifting mechanism between the pan and the loading platform beyond a predefined distance in case that the first lifting mechanism does not provide a sealing contact between the sealing element and the catalyst support body held by the loading platform at the particular point of time. Thus, the synchronization device can also comprise a blocking device or can provide a blocking function which blocks any approach of the catalyst support body towards the slurry located in the pan, if it is not provided that the sealing element covers the input. This is realized by controlling the actuation of the first and the second lifting mechanisms using the blocking device or the blocking function. In the same way, the blocking device or blocking function can be provided to block any release or separation of the sealing element from the input end, if it is not provided that the input end (and preferably also the sealing element) is not separated from the slurry located in the pan. These blocking functions can also be provided by an enabling device, which only enables an actuation of the first and/or the second lifting mechanism if it is provided that the actuation does not result in an unwanted contact of the input end and the slurry. In this context, unwanted contact is a contact of the input end with the slurry within the pan when, at the same time, the input end is not covered by the sealing element. In this regard, the synchronization device of the coating station is adapted to initiate an approaching movement of the sealing element towards the input end by actuating the first lifting device, if the second lifting mechanism is actuated to reduce the distance between the pan and the loading platform in case that the first lifting mechanism does not provide a sealing contact between the sealing element and the catalyst support body held by the loading platform, i.e. a sealing contact between the sealing element and the circumference of the input end.

The second lifting mechanism is adapted for moving the pan from and towards the loading platform along a lifting direction, wherein the loading platform is fixedly positioned with regard to the movement along the lifting direction. Further, the loading platform is pivotely supported with a rotational axis parallel to the lifting direction. In addition, the loading platform can also be provided with a further rotational axis, which is perpendicular to the lifting direction. In this way, the loading platform can turn the catalyst support body upside down, for example immediately after slurry has been introduced into the support body. In addition, the loading platform can move the catalyst support body to a subsequent processing station by eccentric movement, for example the movement of a turntable. In particular, the method and the device of EP 08 161 892 can be used for supporting and transporting the catalyst support body.

The sealing element has elastic properties, the material of the sealing is preferably an elastic material like silicone, rubber or other elastic polymers. In addition, the sealing element can also comprise spring or tension elements, which are combined with elastic or rigid components. This provides a direct contact between sealing element and input end at the complete circumference of the input end thereby completely covering the circumference of the input end. Further, these properties of the sealing element allow to provide a fluidic seal of the circumference of the input end, if the circumference of the input end is covered with the impermeable sealing element.

According to the invention, the sealing element extends in a radial direction towards the centre of the ring shape of the sealing element in a direction inclined to the plane, in which the upper circumference of the sealing element extends. The sealing element preferable tapers towards the centre of the ring shape thereby providing the sealing element with a cross-section tapering towards the centre of the sealing element. The basic shape of the sealing element is adapted to the cross-section of the end of the catalyst support body and can be circular, ovoid, polygonal or in any other shape.

According to a particularly preferred embodiment, the inner end of the sealing element, which circumferentially surrounds the support body is aligned with the plane, in which input end extends, when the sealing element covers the circumference of the input end. In other words, the section of the sealing element adapted for contacting the outer surface of the support body is preferably aligned with the circumferential edge of the support body at the input end when the circumference of the input end is covered by the sealing element. According to this embodiment, the circumference of the input end is covered by the interior circumferential edge of the sealing element, i.e with the inner tip of the sealing element. In this context, the term tip relates to the innermost section of the sealing element extending along a closed circumferential line. Alternatively, the term tip relates to the innermost section of the sealing element extending along a closed strip in form of a cylinder, i.e. in the shape of the region of the outer surface of the catalyst body, which is terminated by the input end and located closely thereto. The inner section of the sealing element and the tip is directed towards the circumferential edge of the support body in the case that the tip extends along the closed line defined by the input end, or is directed towards the plane in which the input end extends, in the case that the tip extends along a cylindrical region of the catalyst body's outer surface at the input end. Thus, according to the inventive method, the catalyst body and the sealing element are moved to each other until the input end is in alignment with the inner circumferential tip of the sealing element thereby providing the step of sealing the outer edge of the input end before slurry is directed into the catalyst body or before the input end comes into contact with the slurry. Similarly, the inventive loading platform assembly or coating station is adapted to carry out the movement described above, i.e. a sealing movement, which brings the tip/tip region of the sealing element in alignment with the input end, wherein this alignment is preferably maintained during the complete step of directing slurry into the input end or the complete step of bringing the input end in contact with the slurry. To this end, the inventive loading platform assembly or coating station comprises a stopper element or an actuator device or a control device, which ensures the alignment of inner tip of the sealing element and the circumferential edge defined by the input end.

The invention can be carried out with the device and the method described in EP 08 161 892. In particular, the step of coating as well as the coating station described herein can be accomplished by the step of coating and the coating station described in EP 08 161 892. Further, the pan, the loading platform, the lifting devices as well as the components for providing vacuum to the catalyst support body can be carried out according to respective components shown in EP 08 161 892. Further, the slurry can be provided according to the coating station shown in EP 08 161 892. Preferably, the loading platform is provided according to the loading platform and the turntable described in EP 08 161 892. In particular, the method for coating, the loading platform as well as the coating station of the present invention can be combined with the processing and positioning device and method disclosed in EP 08 161 892.

DETAILED DESCRIPTION OF THE FIGURES

FIGS. 1a-d show a catalyst support body 10 which is held within a loading platform 20. The support body has a cylindrical shape with two end faces depicted in FIGS. 1a-d as horizontal line. The loading platform 20 holds the support body at an outer surface which extends between both ends. In FIGS. 1a-1d, only a contact element of the loading platform 20 is shown in a symbolic way. The arrangement shown in FIGS. 1a-1d further comprises a sealing element 30 below an open input end 10a of the catalyst support body 10. In addition, a pan 40 is located below the support body 10 and the sealing element 30, wherein slurry 42 is located within the pan 40.

Figure 1A:
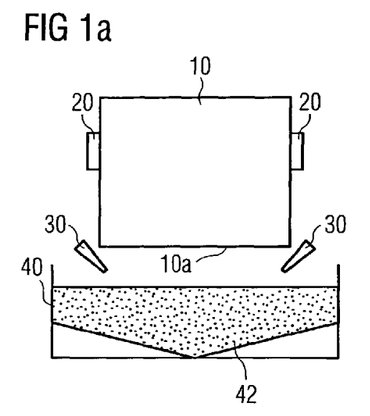
FIGS. 1a-1d show the inventive coating station in a symbolic presentation for explaining the method according to the invention.
Figure 1B:
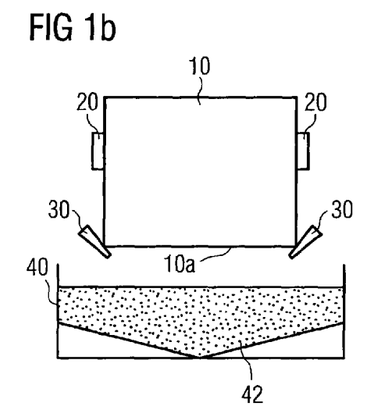

In a first step shown in FIG. 1a, the support body 10 is held by the loading platform 20 at a distance above the sealing element 30 and above the slurry 42. Then, the sealing element 30 is lifted to reach a position as shown in FIG. 1b. In this position, the sealing element covers the complete circumference of the input end 10a. This can be provided by lifting the sealing element or a sealing holder holding the sealing element. In FIGS. 1a-1d, only the sealing element 30 is shown in a symbolic way, other parts of the cover mechanism including the sealing holder are described for example with reference to FIGS. 4a, 4b and 5.

After covering the circumference of the input end 10a by the sealing element 30 as shown in FIG. 1b, the pan 40 including the slurry 42 is lifted towards the support body 10 such that the surface provided by the slurry as well as the slurry itself contacts the input end 10a (as well as a part of the sealing element 30). It can be seen from FIG. 1c that the outer surface circumferentially enclosing the catalyst support body 10 is not in contact with the slurry 42, in particular the section above the circumference of the input end 10a is not in contact with the slurry 42. However, at the same time, the complete input end 10a of the support body 10 is immersed in the slurry.

Figure 1C:
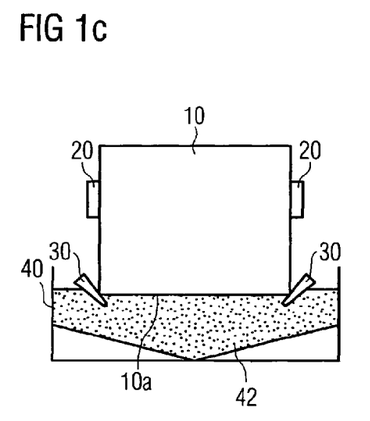
Figure 1D:
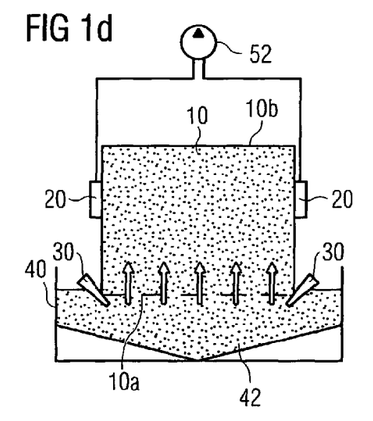

At a subsequent step shown in FIG. 1d, vacuum is applied to an open end 10b of the support body 10 opposed to the input end 10a. The end 10b of the support body 10, opposed to the input end 10a is open and is connected to the open input end 10a via internal channels of the support body 10. A moveable vacuum hood 50 is lowered onto the catalyst support body 10, partly enclosing the support body 10 and briefly enclosing the output end 10b. The vacuum hood 50 is in contact with the loading platform 20, such that the volume above the output end 10b is enclosed by the vacuum hood 50, the sealing connection between the vacuum hood 50 and the loading platform 20, the sealing connection between the loading platform 20 and the circumferential outer surface of the support body 10, the section of this outer surface located above the loading platform 20 as well as by the outer end 10b. Thus, the vacuum hood 50 connected to a vacuum pump 52 applies a vacuum to the output end 10b. By pressure balance and due to the connection via the internal channels of the support body 10, slurry 42 is drawn into the support body 10 via the open input end 10a. In particular, the slurry 42 is drawn through the inner opening of the ring-shaped sealing element 30 as well as through the complete cross-section of the input end 10a. In this way, an amount of the slurry 42 located in the pan 40 is drawn into the support body thereby coating inner surfaces of the catalyst support body 10 which are provided by internal channels not shown). However, during this step of directing an amount of slurry 42 into the inside of the catalyst support body 10, no slurry is transferred to the circumferential outer surface of the support body 10 since the sealing element 30 blocks the slurry 42 at the circumference of the input end 10a. In this way, an amount of slurry is directed into the inside of the catalyst support body, however, without soiling the outer circumferential surface of the catalyst support body 10. In particular, even the section of the circumferential outer surface of the support body 10 located below the surface of the slurry in the pan 40, i.e. the lower section of the catalyst support body 10 being immersed within the slurry, does not contact the slurry since the sealing element 30 provides a cover protection for the outer circumferential surface during the immersion for the input end 10*a* into the slurry.

After having completed the step of directing an amount of slurry 42 into the support body 10, the vacuum provided by pump 52 is terminated, the vacuum hood 50 is released by lifting the vacuum hood from the loading platform 20, similar to the depiction of FIG. 1*c*. Then, the pan 40 is lowered as shown in FIG. 1*b*. Subsequently, the sealing element 30 is removed from the circumference of the input end 10*a* by lowering the sealing element 30. It can be seen from FIGS. 1*a*-1*c* that the pan 40 is lifted and lowered by a distance greater than the distance by which the sealing element 30 is lifted and lowered. This ensures that the sealing element 30 is in contact with the slurry only if necessary, i.e. in the case that the input end 10*a* is immersed into the slurry 42 as shown in FIG. 1*d*. In addition, this ensures that lowering the sealing element 30 does not lead to a contact between the sealing element 30 and the slurry 42. The translational movement (lowering and lifting) of the sealing element 30 can be carried out overlappingly or during the movement (lowering or lifting) of the pan 40 if it is provided that the input end 10*a* contacts the slurry only, if the sealing element 30 covers the circumference of the input end 10*a*.

In an alternative embodiment, the pan 40 can be fixedly positioned and the loading platform 20 lowers and lifts the support body 10 as shown in FIGS. 1*a*-1*d*. In such an embodiment, the lifting mechanism of the sealing element 30 can be active or passive. In particular, the lifting mechanism moving the sealing element can be a passive mechanism comprising springs which urge the sealing element 30 towards the support body 10. In this embodiment, the support body is lowered towards the pan 40 and contacts the sealing element 30. After having contacted the sealing element 30, the circumference of the input end 10*a*, i.e. the circumferential edge of the input end, stays in contact with the sealing element 30 while the force urging the sealing element towards the support body 10 maintains the contact between sealing element 30 and circumference of the input end 10*a*. Upon continuation of the lowering process, the sealing element 30, together with the input end 10*a*, is immersed into the slurry 42, while the spring force exerted on the sealing element 30 ensures that the sealing element covers the circumference of the input end during the complete immersion process.

Figure 2A:
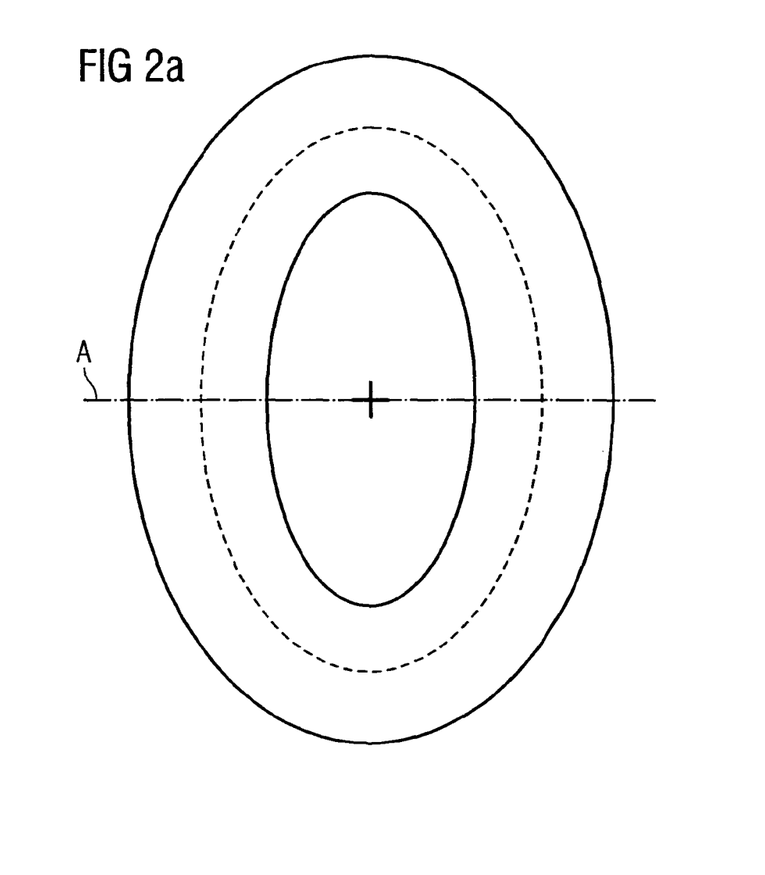
FIGS. 2a, b are a top-view and a cross-sectional view of the inventive sealing element in symbolic presentation.
Figure 2B:
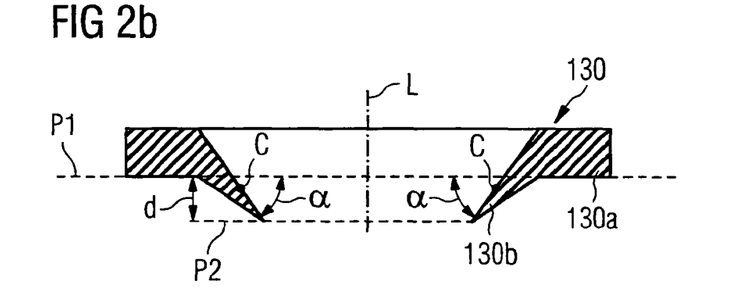

FIGS. 2*a* and 2*b* show the most preferred embodiment for carrying out the invention.

In FIG. 2*a*, a sealing element as used with the invention, is shown in top-view. The sealing element is in the shape of an ovoid ring. The inner circumference of this ring shape is adapted to the outer shape of the catalyst support body, which is to be coated. Therefore, the shape of the sealing element, in particular the shape of the inner circumference of the sealing element shown in FIG. 2*a* corresponds to the outer shape of the support body. Due to the elastic properties of the sealing element, the inner cross-section of the sealing element is preferably marginal smaller than the cross-section of the catalyst support body at the input end of the catalyst support body. In FIG. 2*a*, a contact line is shown as a dashed ovoid line, wherein this line shows the contact area, at which the circumference of the input end contacts the sealing element. The outer circumference of the sealing element shown in FIG. 2*a* has elastic properties and is held by a sealing holder (not shown).

The inner circumference of the sealing element shown in FIG. 2*a* encloses an opening of the sealing element, through which the slurry can be directed to the input end and into the inside of the catalyst support body when the input end is immersed in the slurry and vacuum is applied to the output end of the catalyst support body. In FIG. 2*a*, the centre of the sealing element is located in the centre of this opening and is marked with a cross. The longitudinal axis of this sealing element extends perpendicular to the plane of projection of FIG. 2*a* and extends through the centre of the sealing element.

In FIG. 2*b*, the sealing element of FIG. 2*a* shown as a cross-section along line A as depicted in FIG. 2*a*. The sealing element 130 shown in FIG. 2*b* comprises an outer rim 130*a* as well as a lip 130*b* connected therewith and extending inwardly. In particular, the lip extends towards the longitudinal axis L, which corresponds to the cross shown in FIG. 2*a*. In addition, the lip 130*b* is inclined to a plane P1, along which the outer rim of the sealing element 130*a* extends. The inclination angle is shown with α. The innermost edge of the lip 130*b*, i.e. the inner circumference of the sealing element 130, extends within a plane P2, which is parallel to plane P1. Thus, plane P2 is spaced from plane P1 by a distance d, which corresponds to the inclination angle α.

The contact line shown in FIG. 2*a* as a dotted line corresponds to the contact edge C shown in FIG. 2*b*. The contact point C is depending on the cross-section of the support body which is covered by the sealing element shown in FIG. 2*b* and is preferably located at an inner section of lip 130*b*. FIG. 2*b* has the same orientation as FIGS. 1*a*-1*d* such that the lip 130*b* extends towards the pan, such that the support body can be inserted into the opening defined by the upper surface of the lip 130*b* and onto the upper surface of the lip.

In FIG. 2*b*, lip 130*b* as well as outer rim 130*a* are shown as one integrated element. Further, a sealing holder, to which the outer rim 130*a* is attached to, is not shown in FIG. 2*b*. Sealing holder, or at least a part thereof, outer rim 130*a* and lip 130*b* can be formed as one integral element. Alternatively, these sections can be provided as individual elements attached to each other. Preferably, a part of the sealing holder (not shown) is made of rigid material and provides contact elements, into which an inner part of the sealing holder is connected to. In this case, the inner sealing holder, the outer rim 130*a* as well as lip 130*b* are provided as one element of elastic materials. In general, the lip is made of elastic material. In addition, also the outer rim 130*a* has elastic properties and is manufactured of elastic material. Preferably, silicone is used. In addition, other elastic materials like elastic polymer materials and gum can be used. In a particular embodiment, an upper and/or a lower layer of impermeable material is located on the upper and/or lower surface of the lip 130*b*, and, preferably also on the upper and/or lower surface of the outer rim 130*a*. According to one embodiment, the complete sealing element, preferably together with an inner part of the sealing holder is manufactured of one material and is integrally formed. Preferably, this material is impermeable for liquids, in particular for slurry or components thereof. In another embodiment, the sealing element is made of a permeable material or has a permeable structure like foam. In this case, an impermeable layer is located on the upper, the lower or on both surfaces of the sealing element, in particular of the lip 130*b*.

Angle α defining the inclination, according to which the lip 130*b* extends, is at least 0° and smaller than 90°. Preferably, α is at least 10°, 20°, 30°, 45° or 60°. Further, α is preferably not greater than 85°, 80°, 70°, 60° or 45°. In a particularly preferred embodiment, α is between about 45° and 85°, preferably between about 60° and 80° and, in a particularly preferred embodiment, at least 65 and not greater than 75°. In a most preferred embodiment, α is about 70°.

The ratio between distance d and the diameter of the sealing element is preferably at least 0.1 and not greater than 0.5, preferably at least 0.15 and not greater than 0.3. In a particularly preferred embodiment, this ratio is between 0.2 and 0.3, for example about 0.25. As diameter of the sealing element, the average diameter, minimum diameter or maximum diameter of the curve is defined, which defines the location at which the lip 130b abuts the outer rim 130a. In this regard, the rim 130a extends along a plane perpendicular to the longitudinal axis, whereas the lip is inclined to this plane.

Figure 3A:
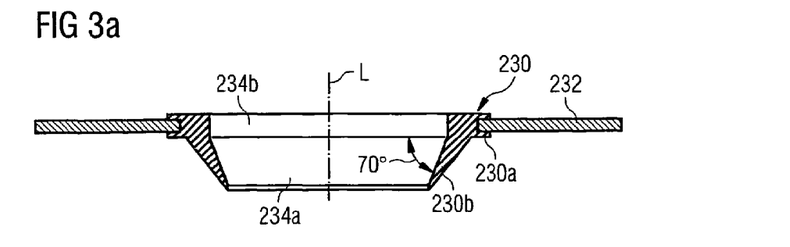
FIGS. 3a, b are a cross-sectional view and a perspective view of a particular embodiment of the invention.

In FIG. 3a, a particular realization of the sealing element according to the invention is shown in cross-section. A sealing holder 232 completely encloses the sealing element 230, the sealing element 230 having an outer rim 230a as well as a lip 230b. The inner lip 230b is inclined to the plane, in which the outer rim 230a and the sealing holder 232 extend, by an angle of about 70°. The outer rim 230a as well as the sealing holder 232 extend radially with regard to a longitudinal axis L. The sealing holder 232 is made of rigid material, for example made of a steel sheet. The inner edge of the steel sheet engages with a groove of the outer rim 230a, which extends outwardly from the longitudinal axis. In this way, the sealing holder 232 is attached to the sealing element 230. Since the sealing element 230 is made of elastic material, the sealing element can be replaced by deforming the sealing elements located within the sealing holder thereby releasing the attachment provided by the groove of the outer rim 230a and the inner edge of the sealing holder 232. A new sealing element can be introduced in the same way by deforming and introducing the inner edge of the sealing holder into the groove of outer rim 230a. The lip 230b directly connected to the outer rim 230a and integrally formed therewith extends towards the longitudinal axis L as well as to the pan (not shown). Therefore, the orientation of FIG. 3a corresponds to the orientation in FIGS. 1a-d as well as 2b. It can be seen from FIG. 3a that the lip is tapered along the direction of extension, i.e. towards the longitudinal axis L (as well as towards the pan).

At the base of the lip 230b, a second groove is provided, which allows a deformation of the lip at its base, i.e. a pivoting movement within a rotational axis at the base of the lip. The groove located at the base of the lip is opposed to the groove located at the outer rim 232a, which extends outwardly towards the sealing holder 230. The opening 234a defined by the tip of the lip is smaller than the opening defined by the base of the lip 230b adjacent to the outer rim 230a. In this way, the catalyst support body (at least its input end) can be introduced into the opening 234b. Since the opening provided by the inner surface of the lip 230b is also tapered due to the inclination of the lip 230b, the circumference of the input end of the support body (not shown) fits into the inner surface provided by the lip 230. Due to the elastic properties of the lip 230b, the circumference of the input end is reliably covered by the inner surface of the lip 230b. The cross-section of the input end of the support body (not shown) is smaller than the opening 234b (for introducing the input end into the sealing element) and is greater than the opening 234a (for allowing an inner section of lip 230b to cover the circumference of the input end).

The sealing holder is connected to a lifting mechanism for allowing a movement of the sealing element along the longitudinal axis L. The lifting mechanism preferably comprises an individually controllable actuator or, in a particular embodiment, in which the loading platform is moveable along the longitudinal axis L, comprises a spring or another force-exerting element (based on hydraulic, pneumatic, electromagnetic or gravity forces) for urging the sealing element against the circumference of the input end, when the input end is lowered towards the pan.

Figure 3B:
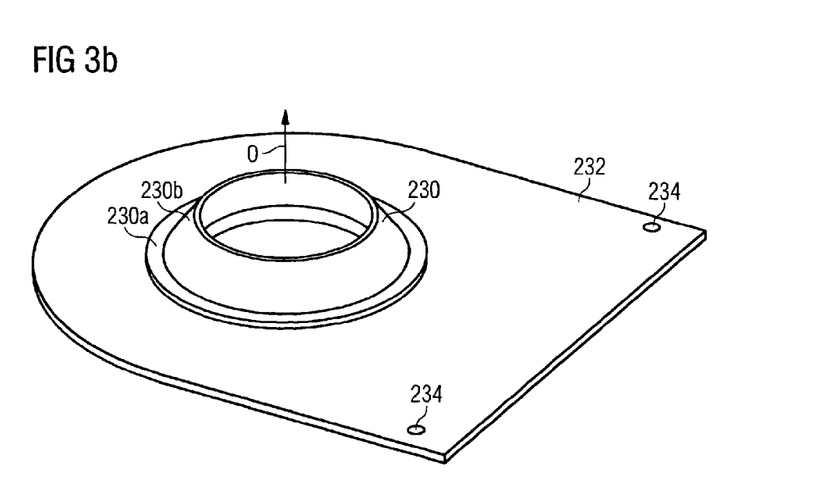

In FIG. 3b, a perspective view of the element shown in FIG. 3a is given. The orientation does not correspond to FIG. 1a-1d, 2b or 3a. Rather, orientation arrow O points towards the pan. The sealing element 230 is enclosed by an inner edge of a sealing holder 232, which is provided with further attachment elements 234, for example for connecting the sealing holder to a lifting mechanism by a screwed fastening. The sealing element comprises a lip 230b, which is adjoined to an outer rim 230a of the sealing element. The sealing element 230 is an insert integrally formed of an elastic material, for example silicone. The outer rim 230a comprises a groove extending outwardly, into which the inner edge of the sealing holder 232 is engaged.

A second groove, opposed to the groove in the outer rim 230a, extends inwardly and is located at the base of the lip 230b. This allows a higher flexibility when force is exerted on lip 230b. The lip 230b is in the form of a truncated cone as also shown in FIG. 3a having a longitudinal axis identical with the longitudinal axis L shown in FIG. 3a. In addition, the truncated cone tapers towards the longitudinal axis. Consequently, the tip of the lip 230b, at which the cross-section is the smallest within the complete truncated cone, provides an opening for introducing slurry into the input end when the support body is (partly) inserted into the sealing element 230. In addition, the thickness of the wall decreases along the tapering direction of the truncated cone, according to which the lip 230b of the sealing element 230 is formed.

The sealing element and the sealing holder shown in FIG. 3b correspond to the sealing holder and the sealing element shown in FIG. 3a. However, the inclination angle of the lip with respect to the plane, along which the sealing holder extends, does not correspond to the angle shown in FIG. 3a for illustrative reasons.

In general, the sealing element is in form or comprises a section (the lip), which is in form of a frustum, in particular a truncated cone, preferably with decreasing wall thickness along the direction, which corresponds to the tapering direction of the truncated cone. In a preferred embodiment, the sealing element further comprises an outer rim extending along a plane, from which the truncated cone arises. The part shaped in the form a truncated cone is adapted for receiving the circumference, i.e. the circumferential edge of the input end of the catalyst support body, and the section extending along the base plane of the truncated cone is adapted for attachment with a sealing holder, for example by providing a circumferential groove extending outwardly towards a sealing holder enclosing the sealing element.

Figure 4:
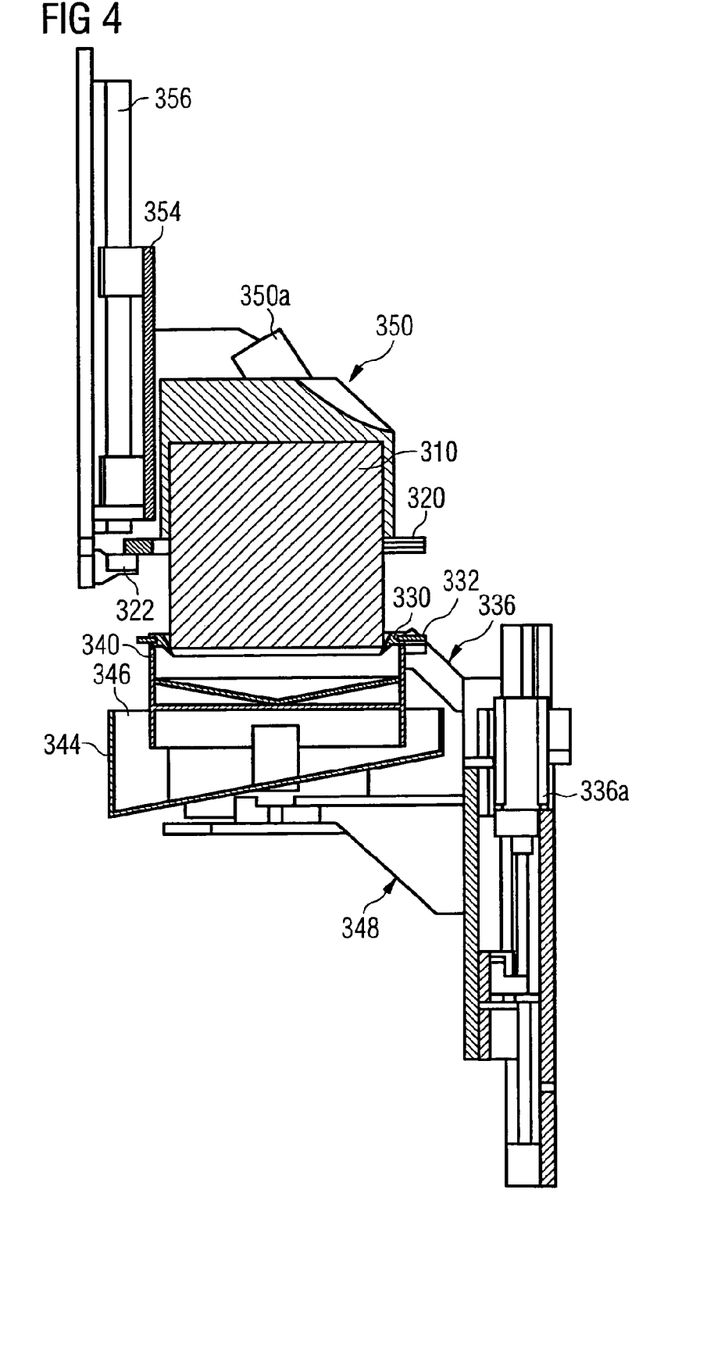
FIG. 4 shows a particular embodiment of the coating station according to the invention equipped with the loading platform according to the invention.

FIG. 4 shows a coating station according to the invention. The coating station comprises a loading platform 320 holding a catalyst support body 310. A sealing element 330 is supported by a sealing holder 332, which is connected to a lifting mechanism 336. The sealing holder 332 is connected with the lifting mechanism 336 via a quick-release fastener. The lifting mechanism comprises an actuator section 336a, which comprises a spindle rod. The coating of FIG. 4 further comprises a pan 340, under which a receiving pan 344 is located, which receives residual slurry via an overrun 346.

The coating station further comprises a moveable vacuum hood 350, which can be lifted/lowered from and onto the loading platform 320. The vacuum hood is moveable and is connected to a vacuum lifting mechanism 354, which is held by a support 322. In addition, the coating station comprises a pivoting device 356, which is connected to the vacuum hood 350 via the vacuum lifting mechanism 354 for pivoting the vacuum hood eccentrically to the longitudinal axis of the loading platform 320 and of the pan 340.

The coating station shown in FIG. 4 comprises a further lifting mechanism for lifting and lowering the pan 340. The pan lifting mechanism 348 is connected to the same support, to which the lifting mechanism for the sealing element is attached to. Therefore, the coating station of FIG. 4 comprises three lifting devices: a first lifting mechanism for lifting and lowering the sealing holder, to which the sealing element is connected, cf. reference signs 336a, 336; a second lifting mechanism for lifting and lowering the pan 340, cf. reference sign 348, as well as a third lifting mechanism for lifting and lowering the vacuum hood 350, cf. reference sign 354. The first lifting mechanism for moving the sealing element as well as the second lifting mechanism for moving the pan are attached to the same support via individually controllable actuators. Another individual support is used for holding the third lifting device, which lifts and lowers the vacuum hood 350. The third lifting mechanism 354 is combined with a pivoting device 356, which is arranged to pivot the vacuum hood 350 with a rotational axis provided eccentrically to the longitudinal axis of the vacuum hood, the pan, the loading platform and the sealing element. The third lifting device is connected to a support 322.

The vacuum hood 350 comprises an opening 350a for applying vacuum to the inside of the vacuum hood 350. The opening 350a is adapted to be connected with a vacuum pump (not shown).

The coating station shown in FIG. 4 can be provided according to the coating station described in EP 08 161 892 except for the sealing element, the sealing holder as well as other components related to the sealing element like the lifting mechanism for lifting and lowering the sealing holder. In addition, the coating station according to the invention can be combined with the processing stations described in EP 08 161 892. Preferably, the loading platform is supported by a pivoting mechanism for turning the support body (and the loading platform) upside down. This pivoting mechanism can be synchronized with another pivoting mechanism for pivoting the vacuum hood. In this way, the vacuum hood can follow the pivoting movement, when the support body is turned upside down and the vacuum hood has not been completely released from the support body. Such mechanisms are described in EP 08 161 829 and can be combined with the invention.

In general, all lifting mechanisms can comprise guiding rods as well as an actuator element, for example a pneumatic or hydraulic piston or an electromagnetic actuator. The support to which the lifting mechanism of the vacuum hood is connected to is preferably connected to the support, to which the lifting devices for the loading platform 322 and the sealing holder 336 are attached to. Preferably, electrical servodrives are used for driving the lifting mechanisms, wherein each lifting mechanism is driven by an associated individual servodrive. Gear mechanisms can be used for connecting the lifting mechanism with the respective servodrive, for example a worm gear or a spindle gear assembly.

Figure 5A:
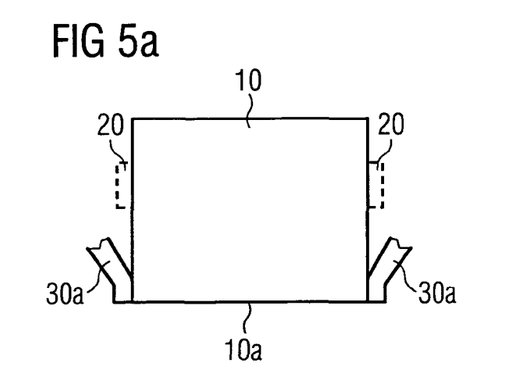
FIGS. 5a-c show the sealing element contacting the catalyst body according to a preferred embodiment of the invention in a symbolic cross-sectional representation.
Figure 5B:
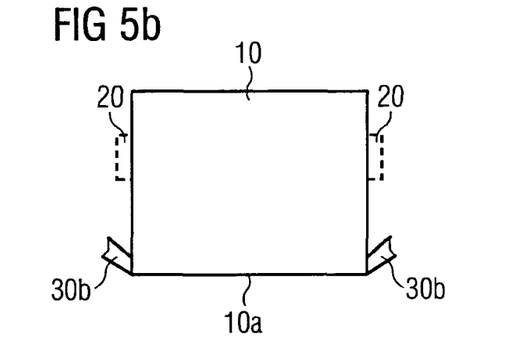
Figure 5C:
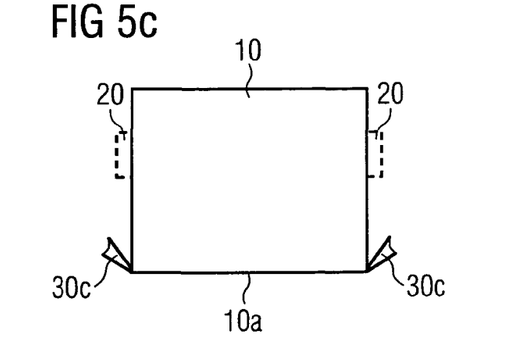

FIGS. 5a-c show the sealing element contacting the catalyst support body according to a preferred embodiment of the invention in a symbolic cross-sectional representation. In FIG. 5a, an inner section of the sealing element 30a contacts a cylindrical region of the catalyst support body 10, the cylindrical region being a small strip which is terminated by the input end 10a. The end of the sealing element is in alignment with the input end. In this way, the amount of slurry remaining at the catalyst sealing element 10 is minimized. At the same time, this alignment ensures the circumferential sealing of the input end at its immersion in slurry. The embodiment in FIG. 5a comprises an elastic sealing element (section) 30a, into which the input end section of the catalyst support body 10 is inserted. The (inner section of the) sealing element is deformed by the inserted section of the catalyst sealing element 10 and extends along the shape of the catalyst support body's outer surface. The sealing element 30a partly extends along the catalyst sealing element 10 and ends at the input end 10a. A tip section of the sealing element 30a is bent along the outer surface of the catalyst sealing element 10 enabled by the elastic properties of the sealing element and resulting from a force occurring during the insertion of the catalyst sealing element 10 into the sealing element. The tip of the sealing element (shown as a flat end in FIG. 5a) is in alignment with the plane in which the input end 10a extends. In the inventive method, in the inventive loading platform, or in the inventive coating station, this can be provided by a mechanical connection between the loading platform 20 and sealing element 30a (or sealing element holder, not shown). The mechanical connection can be provided by a stopper, which enables the exact alignment between the tip of the sealing element 30a and the input end 10a. Instead of a mechanical connection, an electric or electronic connection device can be used, which connects at least one of the actuators providing the movement with another actor or with a sensor, thereby providing the alignment of sealing element 30a and input end 10a using a suitable control device. The embodiments of FIGS. 5b and 5c preferably provide such a connection.

In FIG. 5b, an embodiment similar to the embodiment of FIG. 5a is shown, in which a sealing element 30b is in alignment with the input end 10a, for the case that the input end is inserted in the sealing element 30b for covering the outer surface of the catalyst sealing element 10 with regard to slurry (not shown). The catalyst support body 10 is held by a loading platform 20. In contrast to the embodiment shown in FIG. 5a, the sealing element 30b shown in FIG. 5b does not comprise a tip section bent by the inserted catalyst sealing element 10. Instead, the tip of the sealing element 30b has a cylindrical shape adapted to the outer shape of the catalyst support body 10 at the input end 10a of the catalyst support body 10. The tip of the sealing element is essentially not deformed by the inserted catalyst support body 10. The sealing element 30b comprises a tip region adapted for directly contacting the outer surface of the catalyst support body 10 along an area in form of a cylindrical stripe. Upon insertion, the sealing element 30b is marginally expanded, in contrast to the sealing element 30a of FIG. 5a, which comprises a tip section, which is significantly bent upon insertion of the catalyst support body. The width of the stripe is preferably 2%-10% of the inner diameter of the sealing element. In a particularly preferred embodiment, the width is 2-10 mm, 3-7 mm and most preferably approx. 5 mm. In an embodiment according to the best mode of carrying out the invention, the sealing element is flush with the outer surface of the catalyst support body at the input end of the support body and is in contact with the support body at a sealing surface in form of a cylinder with a height of approx. 5 mm and a diameter of 30-150 mm, preferably 50-10 mm and most preferably 70-90 mm, for example a diameter of approx. 84 or 85 mm. The diameter values relate to the diameter of the sealing element without inserted catalyst support body, i.e. in unstressed condition, which are approximately the same for stressed condition for the embodiments of FIGS. 1a-d, 2a,b, 3a,b and 5b,c.

As regards the best mode of carrying out the invention, FIG. 5b shows the best mode for providing the alignment of the sealing element with regard to the input end, the embodiment of FIG. 5c being used with the most preferred method shown and described in FIGS. 1a-d and having the most preferred geometrical properties of the embodiment of FIG. 2b.

In FIG. 5c, an embodiment similar to the embodiments of FIGS. 5a and 5b is shown. Like the embodiment of FIGS. 5a and 5b, the tip of the sealing element 30c is in alignment with the input end 10a of the catalyst support body 10. However, in contrast to FIG. 5a and similar to FIG. 5b, the sealing element 30c comprises a tip region, which is only marginally deformed by the inserted catalyst support body 10. Further, in contrast to the embodiments of FIGS. 5a and 5b, the sealing element contacts the catalyst support body 10 (i.e. the outer surface of the catalyst support body 30 at the input end 10a) only at a small region. The small region is an area circumferentially extending around the catalyst support body's input end 10a, which can be approximated by a circumferentially closed line, e.g. a circle. The width of the small "cylindrical" region is defined by the elastic properties of the sealing element's tip and the amount of extension resulting from the insertion of the catalyst support body 10.

Like in FIG. 5b and in contrast to FIG. 5a, the tip of the sealing element 30c in FIG. 5c is directed towards the outer surface of the catalyst support body 10. Further, like in FIG. 5b, the (inner section of the) sealing element 30c of FIG. 5c is inclined to the outer surface of the catalyst support body 10. In contrast, the (inner section of the) sealing element 30a of FIG. 5a extends along the outer surface of the catalyst support body 10; only an outer section of the sealing element 30a is inclined to the catalyst support body.

FIGS. 5a and 5b show embodiments with sealing elements 30a,b providing a tip in the shape of a cylinder. The contact area between sealing element and outer surface is a strip circumferentially surrounding the catalyst support body 10. The width of the strip is defined by the widths of the tip (c.f. FIG. 5b) or by the elastic properties of the sealing element and by the extend of deformation occurring during insertion of the catalyst support body into the sealing element (c.f. FIG. 5a). In FIG. 5c, the contact area has approximately the shape of a closed line (defined by the cross-section of the catalyst support body 10. The term line does not reflect the mathematical definition of a group of points having the width of zero. Rather, the term line underlines the width of the contact area, which is significantly smaller than the width of the strip as discussed above in view of FIGS. 5a and 5b. The width of the line defining the contact area between sealing element 30c and the catalyst support body 10 in FIG. 5c is defined the elastic properties of the sealing element 30c and the extend of deformation occurring during insertion of the catalyst support body 10. The extend of deformation in FIG. 5a is significantly greater than the extend of deformation in FIGS. 5b and 5c.

REFERENCE SIGNS 10, 310 catalyst support body
10a, 10b input end/output end of the support body
20, 320 loading platform
322 support for vacuum hood lifting mechanism
30, 30a-c, 130,
230, 330 sealing element
130a, 230a outer rim of sealing element
130b, 230b lip of sealing element
232, 332 sealing holder
234a, b opening of the sealing element
234 connection assembly for the sealing holder
354 lifting mechanism for vacuum hood
356 pivoting mechanism for vacuum hood
336 lifting mechanism
336a actuator section
40, 340 pan
344 receiving pan
346 overrun
348 lifting mechanism for pan
42 slurry 50, 350 vacuum hood
350a opening for connecting vacuum pump
52 vacuum pump
L longitudinal axis
P1, P2 upper/lower plane of sealing element
C contact line of sealing element and input end
α inclination
A intersecting plane
O orientation direction

The invention claimed is:

1. Method for coating a catalyst support body, comprising:
providing the catalyst support body as well as slurry located within a pan;
introducing an open input end of the catalyst support body into the slurry; and,
subsequently,
directing an amount of the slurry though the input end and into the inside of the catalyst support body; wherein
the circumferential edge of the input end is covered with an impermeable sealing element during the step of directing the amount of slurry through the open end, thereby preventing contact between slurry and a circumferential outer surface of the catalyst support body distinct from the input end and applying slurry through the input end to an inner surface of the catalyst support body, and the sealing element has an inner cross-section that is smaller than a cross-section of the catalyst support body at the input end.

2. The method of claim 1, further comprising the step of introducing the input end of the catalyst support body into the sealing element before the step of introducing the input end into the slurry or initial to the step of introducing the input end into the slurry.

3. The method of claim 2, wherein the input end of the catalyst support body is pressed onto the sealing element or is circumferentially enclosed by sealing element, when the input end, together with the sealing element, is immersed within the slurry located in the pan.

4. The method of claim 1, wherein the sealing element and the input end are separated from each other after the step of directing slurry has been completed or upon completing the step of directing slurry through the input end and upon or after the input end and the sealing element have been removed from the slurry located in the pan.

5. The method of claim 1, wherein the step of directing an amount of slurry comprises: applying a pressure difference between the input end of the catalyst support body and an output end of the catalyst support body, the output end being in fluidic connection with the input end via a plurality of channels, whereby the pressure difference is adapted to cause the amount of slurry to flow from the input end, through an inner opening of the sealing element and to the output end.

6. The method of claim 1, wherein the step of introducing comprises releasably holding the catalyst support body by a loading platform and reducing a distance between the loading platform holding the catalyst support body and the pan thereby immersing the input end of the catalyst support body into the slurry located within the pan; wherein the method further comprises covering the circumference of the input end with the sealing element, the sealing element being connected to a sealing holder, wherein the sealing holder presses the sealing element onto the circumference of the input end before and during the steps of introducing the input end and directing an amount of the slurry through the input end; the sealing holder separating the sealing element from the input end after the step of directing has been completed and contact between the input and the slurry located within the pan has ended.

7. A loading platform assembly comprising a loading platform adapted for releasably holding a catalyst support body, and a cover mechanism having a sealing holder and a ring shaped sealing element attached to the sealing holder, the cover mechanism further comprising a first lifting mechanism connected to the sealing holder, wherein the first lifting mechanism provides a moving direction for the sealing holder along a longitudinal axis of the sealing element relative to the loading platform.

8. A coating station for applying an amount of slurry to the inside of a catalyst support body comprising the loading platform of claim 7, further comprising a pan, in which slurry is located, the coating station having a second lifting mechanism providing a relative moving direction between the pan and the loading platform for immersing and removing an open input end of the catalyst support body held by the loading platform into and from the slurry located in the pan, wherein the first lifting mechanism is connected with the second lifting mechanism by a mechanical or electrical synchronization device.

9. The coating station of claim 8, wherein the first lifting mechanism connected to the sealing holder comprises an individual actuator, which is adapted to be controlled separately from any actuators of the pan or of the loading platform.

10. The coating station of claim 8, wherein the sealing element is in the shape of a ovoid, circular or polygonal ring and comprises a lip extending along the circumference of the sealing element, the lip being inclined and extending in a direction away from the loading platform, wherein the lip is adapted to contact a complete circumference of an outer surface of the catalyst support body at the input end of the catalyst support body.

11. The coating station of claim 8, further comprising a movable vacuum hood adapted to sealingly contact the loading platform on an upper side of the loading platform and to apply vacuum to a volume enclosed by the hood and the upper side of the loading platform, wherein the second lifting mechanism is connected to the pan for controllably moving the pan towards a lower side of the loading platform and away from the lower side of the loading platform along the relative moving direction between pan and loading platform.

12. The coating station of claim 8, wherein the synchronization device is adapted to coordinate the movements of the first lifting mechanism and the second lifting mechanism, to inhibit any further approach resulting from actuation of the second lifting mechanism between the pan and the loading platform beyond a predefined distance in the case that the first lifting mechanism does not provide a sealing contact between the sealing element and the catalyst support body held by the loading platform, and to initiate an approaching movement of the sealing element towards the input end if the second lifting mechanism is actuated, to reduce the distance between the pan and the loading platform in the case that the first lifting mechanism does not provide a sealing contact between the sealing element and the catalyst support body held by the loading platform.

13. The coating station of claim 8, wherein the second lifting mechanism is adapted for moving the pan from and towards the loading platform along a lifting direction, wherein the loading platform is fixedly positioned with regard to movements along the lifting direction and is pivotally supported with a rotational axis parallel to the lifting direction.

14. The coating station of claim 8, wherein the material of the sealing element comprises an elastic material.

15. The coating station of claim 8, wherein the sealing element extends in a radial direction toward the centre of the ring shape in a direction inclined to the plane, in which the outer circumference of the sealing element extends, the sealing element tapering towards the centre of the ring shape.

* * * * *